US012558752B2

(12) United States Patent　　　(10) Patent No.:　US 12,558,752 B2

Naramoto　　　(45) Date of Patent:　Feb. 24, 2026

(54) CUTTING FLUID TANK FOR MACHINE TOOL

(71) Applicant: OKUMA CORPORATION, Niwa-gun (JP)

(72) Inventor: Hiroaki Naramoto, Niwa-gun (JP)

(73) Assignee: OKUMA CORPORATION, Niwa-Gun (JP)

( * ) Notice: Subject to any disclaimer, the term of this patent is extended or adjusted under 35 U.S.C. 154(b) by 725 days.

(21) Appl. No.: 17/698,241

(22) Filed: Mar. 18, 2022

(65) Prior Publication Data

US 2022/0314385 A1　　Oct. 6, 2022

(30) Foreign Application Priority Data

Mar. 31, 2021　(JP) ................................. 2021-059663

(51) Int. Cl.
　　*B23Q 11/10*　　　(2006.01)
　　*B23B 25/00*　　　(2006.01)
(52) U.S. Cl.
　　CPC .......... *B23Q 11/1015* (2013.01); *B23B 25/00* (2013.01)
(58) Field of Classification Search
　　None
　　See application file for complete search history.

(56) References Cited

U.S. PATENT DOCUMENTS

| | | | |
|---|---|---|---|
| 2013/0126448 A1* | 5/2013 | McCabe ............ | B01D 17/0211 |
| | | | 210/801 |
| 2016/0184950 A1* | 6/2016 | Morimura ............... | B24B 55/03 |
| | | | 137/572 |
| 2018/0201448 A1* | 7/2018 | Hirata .................... | B65G 65/46 |
| 2020/0122282 A1 | 4/2020 | Kobayashi et al. | |

FOREIGN PATENT DOCUMENTS

JP　　　2020-62728 A　　4/2020

* cited by examiner

*Primary Examiner* — Peter Keyworth

(74) *Attorney, Agent, or Firm* — Troutman Pepper Locke LLP

(57) ABSTRACT

Provided is a cutting fluid tank for a machine tool, with which the operator's time and effort for cleaning are reduced and the maintainability is enhanced, without entailing an increase in size. In a tank body, a cutting fluid flow channel having a spiral shape and extending from a tank center region to a tank outer peripheral region is formed by a flow channel forming plate. An inflow port into which a cutting fluid from inside a machining chamber flows is provided at an outer peripheral region of the lid, whereas an outflow port to take out the cutting fluid in the tank body to an outside is provided at a center region of the lid. A pump to pump up and supply the cutting fluid to the machining chamber is provided at the outflow port.

8 Claims, 5 Drawing Sheets

CUTTING FLUID TANK FOR MACHINE TOOL

DETAILED DESCRIPTION OF THE PRESENT INVENTION

Technical Field

The present invention relates to a cutting fluid tank used for a machine tool such as a machining center and a lathe.

BACKGROUND ART

In a machine tool that performs cutting operations, such as a machining center and a lathe, for example, a cutting fluid (coolant) is commonly used for the purpose of lubricating and cooling tools and discharging sludge. A cutting fluid that has been ejected into a machining chamber in which a cutting operation on a workpiece is performed is discharged from the machining chamber, together with chips and the like that have been scraped off the workpiece. The cutting fluid thus discharged flows into a tank body to be temporarily stored therein, and is then supplied from the tank body to the machining chamber again by a coolant pump.

In recent years, in order to save space of the machine tool, part of the cutting fluid tank is generally placed under the machine tool. When the cutting fluid tank is to be cleaned, the cutting fluid tank needs to be pulled outside from the machine tool for the cleaning. In addition, because the cutting fluid tank is filled with chips, it is difficult to clean well unless a lid of the tank is completely removed.

As a cutting fluid tank for a machine tool, with which the time and effort for cleaning by an operator is reduced and the maintainability is enhanced, Patent Literature 1 discloses a cutting fluid tank including: a first circulation pump having a suction opening that is open upward and being disposed at a location where a flow velocity of the sludge-containing cutting fluid in the tank body is relatively high; a sludge transfer nozzle configured to eject the cutting fluid that is pumped out by the first circulation pump toward a collection pump; a second circulation pump having a suction opening that faces a bottom of the tank body and being disposed at a location where the flow velocity of the cutting fluid in the tank body is relatively low; and a first agitation nozzle configured to eject the cutting fluid that is pumped out by the second circulation pump toward predetermined points in the tank body.

CITATION LIST

Patent Literature

Patent Literature 1: Japanese Unexamined Patent Application Publication JP-A-2020-62728

SUMMARY OF THE INVENTION

Problem to be Solved by the Invention

According to the cutting fluid tank disclosed by Patent Literature 1 above, aside from using a coolant pump disposed at an outflow port in order to supply the machining chamber with the cutting fluid in the tank body, the cutting fluid is transferred to the outflow port by using devices such as the two circulation pumps. This entails a problem that the cutting fluid tank ends up increasing its size.

An object of the present invention is to provide a cutting fluid tank for a machine tool, in which chips in the cutting fluid tank are transferred by the flow of the cutting fluid to an outflow port without using a circulation pump, or the like, whereby operator's time and effort for cleaning are reduced and the maintainability is enhanced without entailing an increase in its size.

Solution to Problem

The present invention includes the following aspects in order to achieve the above-described object.

1) A cutting fluid tank for a machine tool, including: a tank body having a bottom wall that is substantially rectangular in plan view, and side walls extending upward from a peripheral edge of the bottom wall; and a lid that closes an upward opening of the tank body, wherein in the tank body, a cutting fluid flow channel having a spiral shape and extending from a tank center region to a tank outer peripheral region is formed by a flow channel forming plate, an inflow port into which a cutting fluid from inside a machining chamber flows is provided at either one of a center region and an outer peripheral region of the lid, whereas an outflow port to take out the cutting fluid in the tank body to an outside is provided at another one of the center region and the outer peripheral region of the lid, and a pump to pump up and supply the cutting fluid to the machining chamber is provided at the outflow port.

2) The cutting fluid tank for a machine tool, according to the aspect 1) above, wherein the inflow port is provided at the center region of the lid, whereas the outflow port is provided at the outer peripheral region of the lid.

3) The cutting fluid tank for a machine tool, according to the aspect 1) or 2) above, wherein the flow channel forming plate is formed such that a width of the cutting fluid flow channel is uniform.

4) The cutting fluid tank for a machine tool, according to any one of the aspects 1) to 3) above, wherein a tilted plate being lowered along an advancing direction in which the cutting fluid flows is provided at a region, on the bottom wall of the tank body, opposed to the inflow port.

5) The cutting fluid tank for a machine tool, according to any one of the aspects 1) to 4) above, wherein a plurality of nozzles to eject the cutting fluid in the advancing direction of the cutting fluid are provided in the cutting fluid flow channel.

6) The cutting fluid tank for a machine tool, according to the aspect 5) above, wherein at least one of the plurality of nozzles is provided at a corner region of the tank body where a flow of the cutting fluid changes.

7) The cutting fluid tank for a machine tool, according to the aspect 5) above, wherein at least one of the plurality of nozzles is provided at an inner side region of the cutting fluid flow channel.

8) The cutting fluid tank for a machine tool, according to any one of the aspects 5) to 7) above, wherein as a cutting fluid to be ejected from the nozzle, a cutting fluid having been pumped up with the pump and thereafter having passed through a filter is used.

Advantageous Effects of the Invention

In accordance with the cutting fluid tank for a machine tool of the aspect 1) above, the cutting fluid flow channel having a spiral shape is formed, and the pump (coolant pump) is provided at the outflow port, whereby the cutting fluid flows in a spiral fashion from the inflow port to the outflow port. In addition, being spiral allows an abrupt change of the flow direction, which is a cause of an accumulation of chips, to be reduced. Therefore, without using a pump (circulation pump) other than the coolant pump, the cutting fluid containing chips is transferred without stagnation, whereby the operator's time and effort for cleaning are reduced and the maintainability is enhanced, without entailing an increase in its size.

In accordance with the cutting fluid tank for a machine tool of the aspect 2) above, an area in the vicinity of the outflow port where the chips easily accumulate coincides with the outer peripheral region of the tank body, and therefore, the maintainability is further enhanced.

In accordance with the cutting fluid tank for a machine tool of the aspect 3) above, the cutting fluid flow channel has a spiral shape and the width of the cutting fluid flow channel is uniform, whereby the cutting fluid flows uniformly, the stagnation of the cutting fluid is reduced, and the accumulation of the chips is further reduced.

In accordance with the cutting fluid tank for a machine tool of the aspect 4) above, the cutting fluid at the inflow port flows in one direction, and the flow is accelerated in an advancing direction thereof, whereby the stagnation of the cutting fluid in the vicinity of the inflow port is reduced, and the accumulation of the chips in the vicinity of the inflow port is further reduced.

In accordance with the cutting fluid tank for a machine tool of the aspect 5) above, the flow of the cutting fluid is accelerated by the nozzles, the stagnation becomes less likely to occur, and the accumulation of the chips over the entire cutting fluid flow channel is reduced.

In accordance with the cutting fluid tank for a machine tool of the aspect 6) above, the nozzle is provided at the corner region where the stagnation is likely to occur, whereby the accumulation of the chips at the corner region is further reduced. The nozzle need not be provided at every corner region, and may be provided at one or an appropriate plurality of corner regions.

In accordance with the cutting fluid tank for a machine tool of the aspect 7) above, because the flow velocity is low and chips easily accumulate on the inner side of the spiral, the nozzle is provided at the inner side region of the flow, whereby the accumulation of the chips is further reduced.

In accordance with the cutting fluid tank for a machine tool of the aspect 8) above, the cutting fluid having passed through the filter whereby the chips have been removed is not only provided to the machining chamber, but also provided to the nozzles that are used for preventing the chips in the tank body from been accumulated, and therefore, an efficient system is constructed.

DESCRIPTION OF EMBODIMENTS

Figure 6:
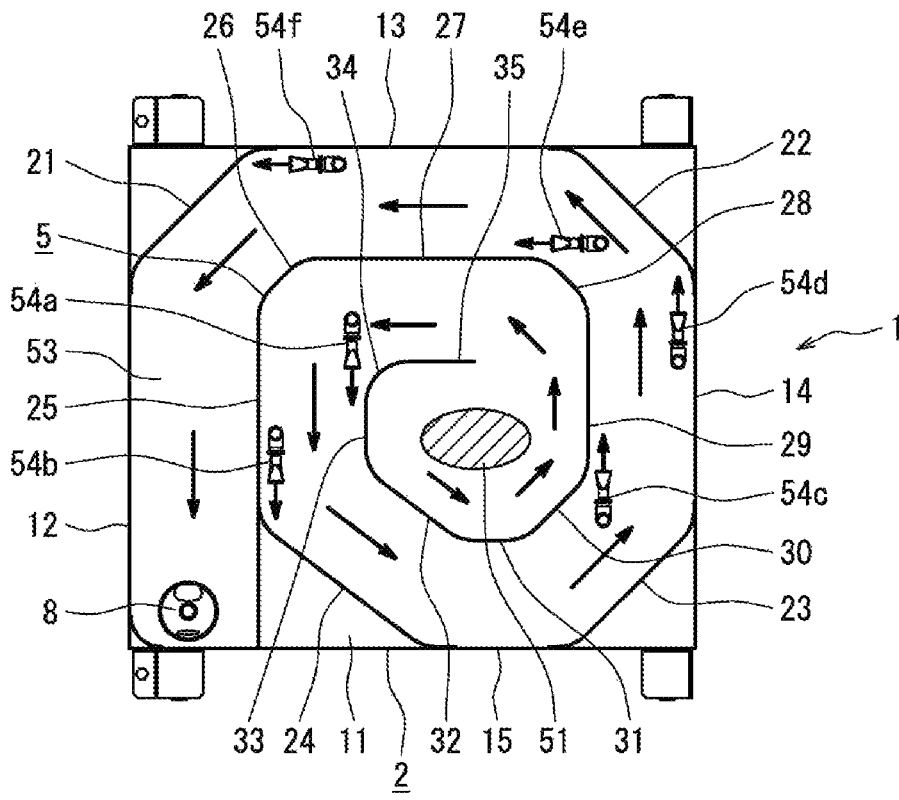
FIG. 6 is a plan view, corresponding to FIG. 2 of the first embodiment.

The embodiments of the present invention will be described below, with reference to the drawings. In the following description, the left side and the right side of FIG. 2 and FIG. 6 are referred to as left and right, respectively, and, likewise, the lower side and the upper side are referred to as front and rear, respectively.

FIG. 1 to FIG. 4 show a cutting fluid tank for a machine tool according to a first embodiment of the present invention.

Figure 1:
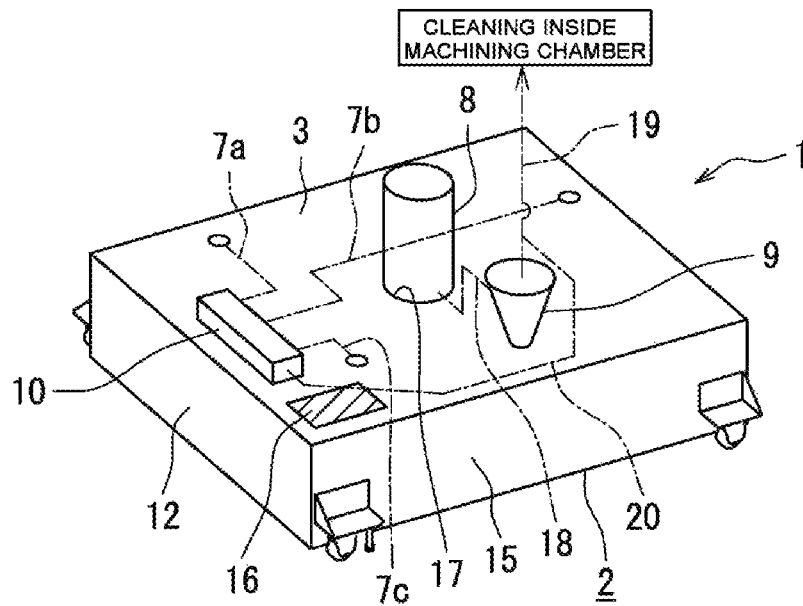
FIG. 1 a schematic perspective view showing a cutting fluid tank for a machine tool according to a first embodiment of the present invention.
Figure 2:
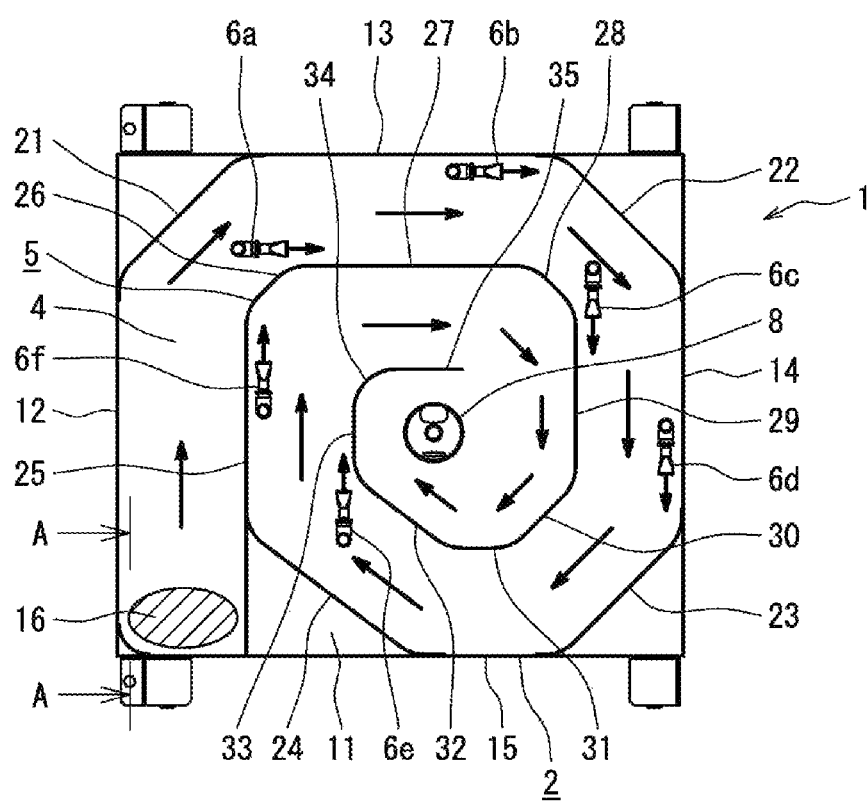
FIG. 2 is a plan view showing a state where a lid in FIG. 1 is removed.

A cutting fluid tank (1) for a machine tool according to the first embodiment is a device configured to store a cutting fluid containing chips which is discharged from a machining chamber (not shown) of the machine tool and to send the cutting fluid to the machining chamber after the chips contained therein are removed, and as shown in FIG. 1 and FIG. 2, includes: a tank body (2) having a bottom wall (11) that is substantially rectangular in plan view and four side walls (left wall (12), rear wall (13), right wall (14), and front wall (15)) extending vertically upward from a peripheral edge of the bottom wall (11); a lid (3) that closes an upward opening of the tank body (2); a flow channel forming plate (5) that forms a cutting fluid flow channel (4) having a spiral shape in the tank body (2); a plurality of (six in the drawings) nozzles (6a), (6b), (6c), (6d), (6e), (6f); a plurality of (three in the drawings) pipes (7a), (7b), (7c); a coolant pump (8) disposed above the lid (3); a filter (9); and a valve unit (10).

An inflow port (16) and an outflow port (17) for the cutting fluid are provided at the lid (3).

The cutting fluid discharged from the machining chamber and containing chips that are generated at the time of machining is supplied to the inflow port (16).

A coolant pump (8) is provided at the outflow port (17). The coolant pump (8) pumps up the cutting fluid in the tank body (2), and the pumped-up cutting fluid is discharged toward the machining chamber.

The filter (9), being connected to the coolant pump (8) via an inflow-side pipe (18) and being connected to the machining chamber via an outflow-side pipe (19), is configured to filter the cutting fluid taken out with the coolant pump (8) before being supplied to the machining chamber, whereby the cutting fluid in which chips have been removed is supplied to the machining chamber.

The cutting fluid having passed through the filter (9) is, separately, sent to a valve unit (10) via a branch pipe (20), and the valve unit (10) is connected to the pipes (7a), (7b), (7c) being in communication with respective nozzles (6a), (6b), (6c), (6d), (6e), (6f), which allows control as to whether the supply of the cutting fluid is implemented or stopped for each pipe (7a), (7b), (7c).

The first embodiment is characterized in that: the inflow port (16) for the cutting fluid is provided at a corner region (region sandwiched between the left wall (12) and the front wall (15)) of the lid (3); the outflow port (17) provided with the coolant pump (8) is provided at the center region of the lid (3); and the flow channel forming plate (5) forms, in the tank body (2), the cutting fluid flow channel (4) having a spiral shape and extending from the outer peripheral region to the center region.

As shown in FIG. 2, the flow channel forming plate (5) has, as components of an outermost peripheral region: a first corner portion (21) provided at a corner region sandwiched between the left wall (12) and the rear wall (13); a second corner portion (22) provided at a corner region sandwiched between the rear wall (13) and the right wall (14); a third corner portion (23) provided at a corner region sandwiched between the right wall (14) and the front wall (15); and a fourth corner portion (24) provided at a corner region sandwiched between the front wall (15) and a front end part of a first straight portion (25) parallel to the left wall (12).

Connection portions that connect each corner portion (21), (22), (23), (24) with the corresponding side wall (12), (13), (14), (15) and the first straight portion (25) are each formed in a curved shape in plan view.

With the above-described components of the outermost peripheral region of the flow channel forming plate (5), an outermost peripheral wall of the cutting fluid flow channel (4) having a spiral shape is formed by a part of the left wall (12) with a rear end part thereof being excluded, the first corner portion (21), an intermediate part of the rear wall (13), the second corner portion (22), an intermediate part of the right wall (14), the third corner portion (23), an intermediate part of the front wall (15), and the fourth corner portion (24).

The flow channel forming plate (5) has, as components of an inside of the outermost peripheral region: in addition to the first straight portion (25) parallel to an intermediate part of the left wall (12); a fifth corner portion (26) parallel to an intermediate part of the first corner portion (21); a second straight portion (27) parallel to the intermediate part of the rear wall (13); a sixth corner portion (28) parallel to an intermediate part of the second corner portion (22); a third straight portion (29) parallel to the intermediate part of the right wall (14); a seventh corner portion (30) parallel to an intermediate part of the third corner portion (23); a fourth straight portion (31) parallel to the intermediate part of the front wall (15); an eighth corner portion (32) parallel to an intermediate part of the fourth corner portion (24); a fifth straight portion (33) parallel to an intermediate part of the first straight portion (25); a ninth corner portion (34) parallel to an intermediate part of the fifth corner portion (26); and a sixth straight portion (35) parallel to an intermediate part of the second straight portion (27).

Connection portions that connect each corner portion (26), (28), (30), (32), (34) with the corresponding straight portion (25), (27), (29), (31), (33), (35) are each formed in a curved shape in plan view.

The eighth corner portion (32), the fifth straight portion (33), the ninth corner portion (34), and the sixth straight portion (35) are formed, as components of an innermost peripheral region, so as to surround a suction opening of the coolant pump (8).

In the above description, each component (21), (22), (23), (24), (25), (26), (27), (28), (29), (30), (31), (32), (33), (34), (35) of the flow channel forming plate (5) is formed such that the cutting fluid flow channel (4) has a uniform width.

Figure 3:
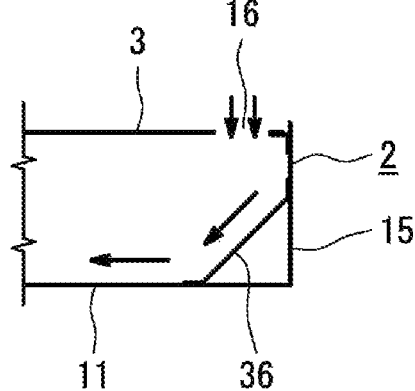
FIG. 3 is a vertical cross-sectional view taken along lines A-A in FIG. 2.

In addition, as shown in FIG. 3, the flow channel forming plate (5) has a tilted plate (36) disposed at a region, on the bottom wall (11) of the tank body (2), opposed to the inflow port (16), as a component for receiving the cutting fluid having dropped from the inflow port (16). The tilted plate (36) is formed so as to be lowered along an advancing direction in which the cutting fluid flows toward the rear side. The cutting fluid having flowed in through the inflow port (16) is, as shown by arrows in FIG. 3, guided by the tilted plate (36) to flow in one direction, and the flow of the cutting fluid is accelerated in the advancing direction of the cutting fluid.

Figure 4:
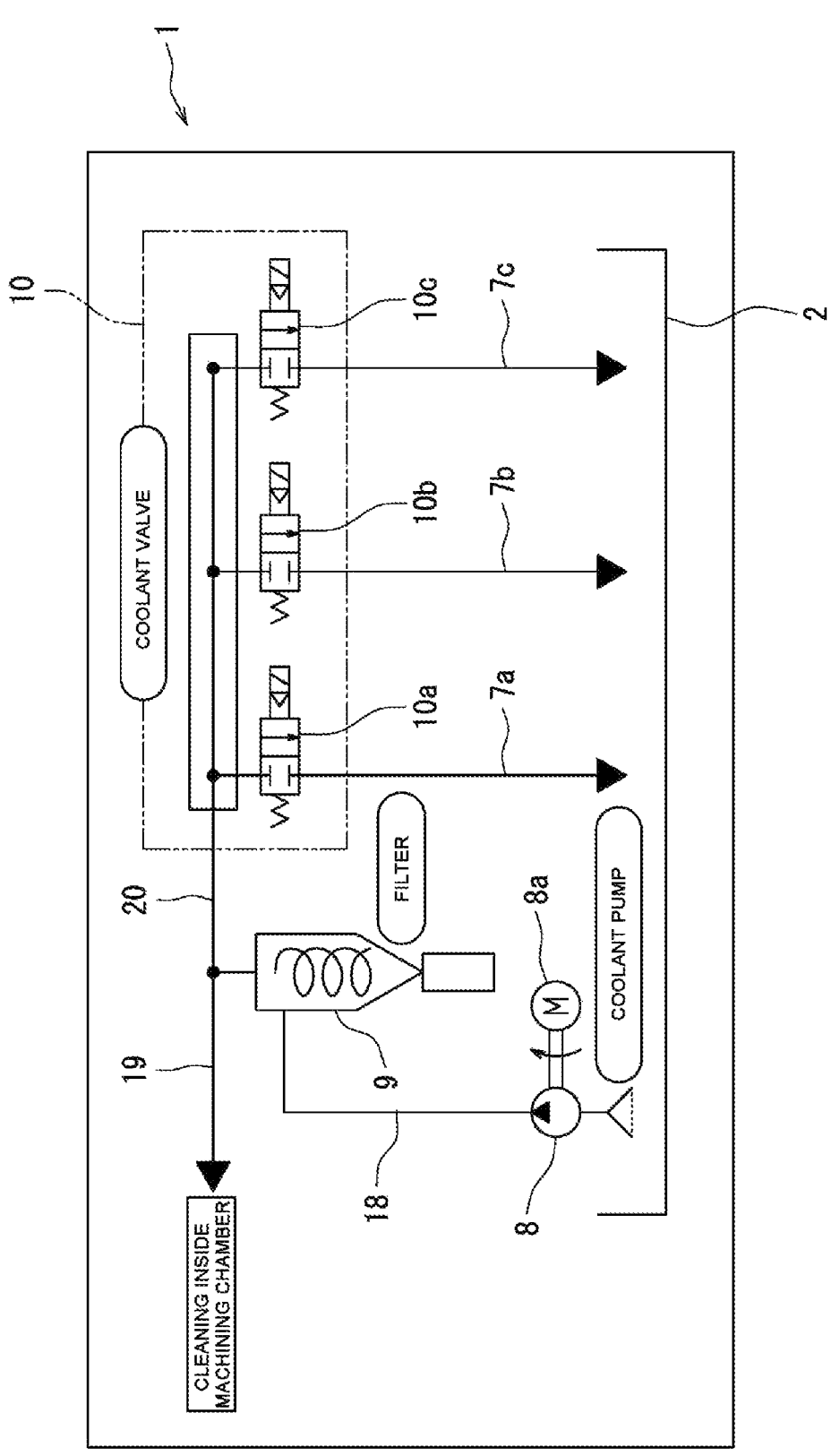
FIG. 4 is a circuit diagram showing the interrelationship among components provided at the lid in FIG. 1.

FIG. 4 is a circuit diagram showing the interrelationship among components provided in the cutting fluid tank (1). As shown in FIG. 4, the valve unit (10) has a plurality of (three in an example shown in the drawing) coolant valves (10*a*), (10*b*), (10*c*), and each valve (10*a*), (10*b*), (10*c*) is provided for each pipe (7*a*), (7*b*), (7*c*) in one-to-one correspondence. The coolant pump (8) is driven by a motor (8*a*) whereby the cutting fluid in the tank body (2) is pumped up, and is supplied to the machining chamber via the filter (9), to be used for cleaning the inside of the machining chamber. The cutting fluid to be supplied to the machining chamber is caused to pass through the filter (9) whereby chips and the like are removed. The cutting fluid having passed through the filter (9) is also, separately, supplied to the pipes (7*a*), (7*b*), (7*c*) being in communication with the plurality of nozzles (6*a*), (6*b*), (6*c*), (6*d*), (6*e*), (6*f*) via the coolant valves (10*a*), (10*b*), (10*c*) of the valve unit (10). Two nozzles among the nozzles (6*a*), (6*b*), (6*c*), (6*d*), (6*e*), (6*f*) are connected to each pipe (7*a*), (7*b*), (7*c*), and each coolant valve (10*a*), (10*b*), (10*c*) is individually opened and closed, whereby six (three pairs of) nozzles (6*a*), (6*b*), (6*c*), (6*d*), (6*e*), (6*f*) are selectively turned on or off as required, i.e., all the three pairs are turned on, only a specified pair is turned on, and the like.

The flow channel forming plate (5) formed as shown in FIG. 2, causes the cutting fluid having flowed in from the inflow port (16) to the inside of the tank body (2), as shown by the arrows in FIG. 2, to be guided by the side walls (12), (13), (14), (15), the components (21), (22), (23), (24) in the outermost peripheral region of the flow channel forming plate (5), and the inside components (25), (26), (27), (28), (29), (30), (31) of the flow channel forming plate (5), thereby flowing from the outside to the inside of the cutting fluid flow channel (4) in a spiral fashion, and then to be guided by the components (32), (33), (34), (35) in the innermost peripheral region of the flow channel forming plate (5) to reach the outflow port (17).

The six nozzles (6*a*), (6*b*), (6*c*), (6*d*), (6*e*), (6*f*) facilitate the flow of the cutting fluid, and in this embodiment, as shown in FIG. 2, are provided: between the first corner portion (21) and the fifth corner portion (26) and on the inner side of the flow channel; at an upstream side and on the rear side of the second corner portion (22); between the second corner portion (22) and the sixth corner portion (28) and on the inner side of the flow channel; at an upstream side and on the right side of the third corner portion (23); between the fourth corner portion (24) and the eighth corner portion (32) and on the inner side of the flow channel; and at an upstream side and on the left side of the fifth corner portion (26), respectively.

With the cutting fluid tank (1) for a machine tool according to the above-described embodiment, as for a pump, only a coolant pump (8), which is an essential component for supplying the cutting fluid to the machining chamber, is used, and any additional circulation pump or the like is not separately used. This configuration allows the cutting fluid tank (1) to be downsized. In the case where any additional pump is not used separately, there arises a concern about the accumulation of the chips. However, by forming a cutting fluid flow channel (4) having a spiral shape and causing the cutting fluid to flow in a spiral fashion, an abrupt change of the flow direction, which is a cause of the accumulation of the chips, is reduced, and therefore the cutting fluid containing chips is transferred without stagnation. Thus, the operator's time and effort for cleaning are reduced and the maintainability is enhanced, without entailing an increase in its size.

With the cutting fluid tank (1) for a machine tool according to the above-described embodiment, the cutting fluid having passed through the filter (9) whereby the chips have been removed is not only provided to the machining chamber, but also provided to the nozzles (6a), (6b), (6c), (6d), (6e), (6f) that are used for preventing the chips in the tank body (2) from being accumulated, whereby an efficient system is constructed.

With the flow channel forming plate (5) according to the above-described embodiment, the flow channel width of the cutting fluid flow channel (4) having a spiral shape is uniform, whereby the cutting fluid flows uniformly, the stagnation of the cutting fluid is reduced, and the accumulation of the chips is further reduced. In addition, with the tilted plate (36) according to the above-described embodiment, the cutting fluid at the inflow port (16) flows in one direction, and the flow is accelerated in an advancing direction of the cutting fluid, whereby the stagnation of the cutting fluid in the vicinity of the inflow port (16) is reduced, and the accumulation of the chips in the vicinity of the inflow port (16) is further reduced.

In addition, by arranging the plurality of nozzles (6a), (6b), (6c), (6d), (6e), (6f) in the cutting fluid flow channel (4) to facilitate the flow of the cutting fluid, the cutting fluid flows uniformly, the stagnation of the cutting fluid is reduced, and the accumulation of the chips is further reduced.

Regarding the arrangement of the plurality of nozzles (6a), (6b), (6c), (6d), (6e), (6f) in the cutting fluid flow channel (4), providing some nozzles (6b), (6d), (6f) at the corner regions (upstream side of the corner regions), where the stagnation is likely to occur, allows further reduction of the chip accumulation at the corner regions, and in addition, providing nozzles (6a), (6c), (6e) at the inner side region of the flow, considering that, on the inner side of the spiral, the flow velocity is low and the chips easily accumulate, allows the chip accumulation to be further reduced.

Figure 5:
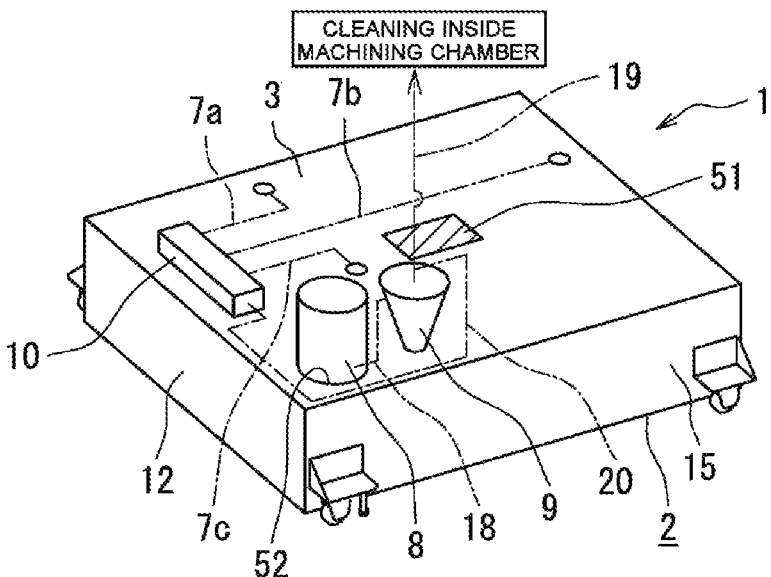
FIG. 5 is a schematic view showing a cutting fluid tank for a machine tool according to a second embodiment of the present invention, which is a perspective view corresponding to FIG. 1 of the first embodiment.
Figure 7:
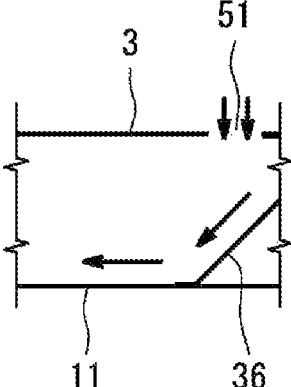
FIG. 7 is a vertical cross-sectional view, corresponding to FIG. 3 of the first embodiment.

FIG. 5 to FIG. 7 show a cutting fluid tank (1) for a machine tool according to a second embodiment of the present invention.

The second embodiment is characterized in that: an inflow port (51) for the cutting fluid is provided at the center region of the lid (3); an outflow port (52) provided with the coolant pump (8) is provided at the corner region (region sandwiched between the left wall (12) and the front wall (15)) of the lid (3); and a cutting fluid flow channel (53) having a spiral shape and extending from the center region to the outer peripheral region is formed, in the tank body (2), by the flow channel forming plate (5).

The flow channel forming plate (5) itself is configured to have the same shape as one in the first embodiment. The differences from the first embodiment are: the positions of the inflow port (51) and the outflow port (52); the direction in which the cutting fluid flows in the cutting fluid flow channel (53) having a spiral shape; and the arrangement positions of a plurality of nozzles (54a), (54b), (54c), (54d), (54e), (54f). In the following description, the same reference signs are denoted for the same components as in the first embodiment, and the description thereof is omitted. Only the differences will be described below.

By arranging the inflow port (51) and the outflow port (52) oppositely to the first embodiment, the cutting fluid having flowed in from the inflow port (51) to the inside of the tank body (2), as shown by arrows in FIG. 6: is first guided by the components (35), (34), (33), (32) in the innermost peripheral region of the flow channel forming plate (5), is thereafter guided by the inner components (31), (30), (29), (28), (27), (26), (25) of the flow channel forming plate (5), the side walls (15), (14), (13), (12), and the components (24), (23), (22), (21) in the outermost peripheral region of the flow channel forming plate (5) to flow in the cutting fluid flow channel (53) outward in a spiral fashion from the center region to the outer peripheral region; and reaches the outflow port (52) provided with the coolant pump (8).

The six nozzles (54a), (54b), (54c), (54d), (54e), (54f), in the present embodiment, as shown in FIG. 6, are provided: between the fifth corner portion (26) and the ninth corner portion (34) and on the inner side of the flow channel; at an upstream side and on the rear side of the fourth corner portion (24); between the third corner portion (23) and the seventh corner portion (30) and on the inner side of the flow channel; at an upstream side and on the right side of the second corner portion (22); between the second corner portion (22) and the sixth corner portion (28) and on the inner side of the flow channel; and at an upstream side and on the right side of the first corner portion (21), respectively.

As shown in FIG. 7, the tilted plate (36) is disposed at a region, on the bottom wall (11) of the tank body (2), opposed to the inflow port (51), and is formed so as to be lowered along the advancing direction in which the cutting fluid flows toward the rear side. The cutting fluid having flowed in through the inflow port (51) is, as shown by arrows in FIG. 7, guided by the tilted plate (36) to flow in one direction, and the flow is accelerated in the advancing direction of the cutting fluid. The circuit diagram of the second embodiment, corresponding to FIG. 4 for the first embodiment, is the same as that in FIG. 4.

With the cutting fluid tank (1) for a machine tool according to the second embodiment, the same advantageous effects as the first embodiment shown in FIG. 1 to FIG. 4 are exhibited. In addition, because an area in the vicinity of the outflow port (52) where the chips easily accumulate coincides with the outer peripheral region of the tank body (2), the maintainability is further enhanced, which is the additional advantageous effect as compared with the first embodiment.

In either of the first and second embodiments, the shape of the flow channel forming plate (5) for forming the cutting fluid flow channel (4), (53) having a spiral shape, the arrangement positions of the nozzles (6a), (6b), (6c), (6d), (6e), (6f), (54a), (54b), (54c), (54d), (54e), (54f), and the like, are not limited to those shown in the drawings.

REFERENCE SIGNS LIST (1): cutting fluid tank for machine tool
(2): tank body
(3): lid
(4): cutting fluid flow channel
(5): flow channel forming plate
(6a), (6b), (6c), (6d), (6e), (6f): nozzle
(8): coolant pump (pump)
(9): filter
(11): bottom wall
(12), (13), (14), (15): side wall
(16): inflow port
(17): outflow port
(36): tilted plate
(51): inflow port
(52): outflow port

9

(53): cutting fluid flow channel (54*a*), (54*b*), (54*c*), (54*d*), (54*e*), (54*f*): nozzle

The invention claimed is:

1. A cutting fluid tank for a machine tool, comprising: a tank body having a bottom wall that is substantially rectangular in plan view, and four side walls extending upward from a peripheral edge of the bottom wall; and a lid that closes an upward opening of the tank body, wherein in the tank body, a cutting fluid flow channel having a spiral shape and extending from a tank center region to a tank outer peripheral region is formed by a flow channel forming plate having a spiral part, an inflow port into which a cutting fluid from inside a machining chamber flows is provided at a center region of the lid, whereas an outflow port configured to take out the cutting fluid in the tank body to an outside is provided at an outer peripheral region of the lid, and a pump configured to pump up and supply the cutting fluid to the machining chamber is provided at the outflow port, wherein, the flow channel forming plate has, as components of an outermost peripheral region: a first corner portion provided at a corner region sandwiched between a first side wall and a second side wall; a second corner portion provided at a corner region sandwiched between the second side wall and a third wall; a third corner portion provided at a corner region sandwiched between the third wall and front a side wall; and the outflow port is provided at a fourth corner portion sandwiched between the front side wall and the first side wall.

2. The cutting fluid tank for a machine tool, according to claim 1, wherein the flow channel forming plate is formed such that a width of the cutting fluid flow channel is uniform.

3. The cutting fluid tank for a machine tool, according to claim 1, wherein a tilted plate being lowered along an advancing direction in which the cutting fluid flows is provided at a region, on the bottom wall of the tank body, opposed to the inflow port.

4. The cutting fluid tank for a machine tool, according to claim 1, wherein a plurality of nozzles configured to eject the cutting fluid in the advancing direction of the cutting fluid are provided in the cutting fluid flow channel.

5. The cutting fluid tank for a machine tool, according to claim 4, wherein at least one of the plurality of nozzles is provided at a corner region of the tank body where a flow of the cutting fluid changes.

6. The cutting fluid tank for a machine tool, according to claim 4, wherein at least one of the plurality of nozzles is provided at an inner side region of the cutting fluid flow channel.

7. The cutting fluid tank for a machine tool, according to claim 4, wherein, as a cutting fluid to be ejected from the nozzle, a cutting fluid having been pumped up with the pump and thereafter having passed through a filter is used.

8. A cutting fluid tank for a machine tool, comprising: a tank body having a bottom wall that is substantially rectangular in plan view, and four side walls extending upward from a peripheral edge of the bottom wall; and a lid that closes an upward opening of the tank body, wherein in the tank body, a cutting fluid flow channel having a spiral shape and extending from a tank center region to a tank outer peripheral region is formed by a flow channel forming plate having a spiral part, an inflow port into which a cutting fluid from inside a machining chamber flows is provided at an outer peripheral region of the lid, whereas an outflow port configured to take out the cutting fluid in the tank body to an outside is provided at a center region of the lid, and a pump configured to pump up and supply the cutting fluid to the machining chamber is provided at the outflow port, wherein, the flow channel forming plate has, as components of an outermost peripheral region: a first corner portion provided at a corner region sandwiched between a first side wall and a second side wall; a second corner portion provided at a corner region sandwiched between the second side wall and a third sidewall; a third corner portion provided at a corner region sandwiched between the third wall and a fourth side wall; and the inflow port is provided at a fourth corner portion sandwiched between the fourth side wall and the first side wall.

* * * * *